(12) United States Patent
Semba

(10) Patent No.: US 7,826,170 B2
(45) Date of Patent: Nov. 2, 2010

(54) APPARATUS AND METHOD FOR ADJUSTING A FEED-FORWARD SIGNAL FOR SEEK CONTROL DURING A SEEK OPERATION

(75) Inventor: Tetsuo Semba, San Jose, CA (US)

(73) Assignee: Hitachi Global Storage Technologies Netherlands, B.V, Amsterdam (NL)

( * ) Notice: Subject to any disclaimer, the term of this patent is extended or adjusted under 35 U.S.C. 154(b) by 119 days.

(21) Appl. No.: 12/212,781

(22) Filed: Sep. 18, 2008

(65) Prior Publication Data

US 2010/0067342 A1   Mar. 18, 2010

(51) Int. Cl.
G11B 5/584 (2006.01)
G11B 21/02 (2006.01)
G11B 5/58 (2006.01)
(52) U.S. Cl. .................... 360/78.09; 360/75; 360/77.01
(58) Field of Classification Search ........................ None
See application file for complete search history.

(56) References Cited

U.S. PATENT DOCUMENTS

| | | | |
|---|---|---|---|
| 5,065,263 A * | 11/1991 | Yoshida et al. ........... | 360/77.03 |
| 5,550,685 A * | 8/1996 | Drouin .................... | 360/77.08 |
| 5,675,558 A | 10/1997 | Katoh | |
| 6,417,983 B1 * | 7/2002 | Yatsu ...................... | 360/77.04 |
| 6,437,936 B1 * | 8/2002 | Chen et al. ............... | 360/77.04 |
| 6,469,861 B2 * | 10/2002 | Onuki et al. ............. | 360/77.02 |
| 6,538,839 B1 * | 3/2003 | Ryan ....................... | 360/77.02 |
| 7,042,827 B2 | 5/2006 | Cho et al. | |
| 7,283,321 B1 | 10/2007 | Sun et al. | |
| 7,372,659 B2 * | 5/2008 | Takaishi .................. | 360/77.04 |

(Continued)

FOREIGN PATENT DOCUMENTS

EP    0507907    1/1999

(Continued)

OTHER PUBLICATIONS

Yang, et al., "Multi-rate Short-seeking Control of Dual-actuator Hard Disk Drives for Computation Saving", *American Control Conference, 2005*. Proceedings of the 2005 Volume, Issue, Jun. 8-10, 2005. http://www.ieeexplore.ieee.org/search/srchabstract. jsp?arnumber=1470466&isnumber=31519&punumber=9861& dockey=1470466@ieeecngs&query=%28%28multi-rate +short-seek, (Jun. 2005),3210-3215.

(Continued)

*Primary Examiner*—K. Wong

(57) ABSTRACT

A hard disk drive control module has a feed-forward signal input port communicatively coupled with a reference model. The hard disk drive control module has a tracking error signal input port communicatively coupled with a magnetic transducer of the hard disk drive. The hard disk drive control module has an error calculator module configured for determining a difference between an estimated tracking error signal in response to a first feed-forward signal and an actual tracking error signal of the magnetic transducer in response to the first feed-forward signal. The hard disk drive control module has a feed-forward signal adjuster module configured for adjusting a gain and a phase for a second feed-forward signal based on the difference between the estimated tracking error signal in response to the first feed-forward signal and the actual tracking error signal of the magnetic transducer. The hard disk drive control module has a feed-forward signal adjustment output port communicatively coupled to the second feed-forward signal.

11 Claims, 7 Drawing Sheets

U.S. PATENT DOCUMENTS

| | | | |
|---|---|---|---|
| 7,457,076 B2* | 11/2008 | Semba et al. | 360/78.06 |
| 2007/0008646 A1 | 1/2007 | Lee et al. | |
| 2007/0253097 A1 | 11/2007 | Sun et al. | |

FOREIGN PATENT DOCUMENTS

| | | |
|---|---|---|
| WO | WO-97/44782 | 11/1997 |

OTHER PUBLICATIONS

Ryoo, et al., "New Fine Seek Control for Optical Disk Drives", *Korea Advanced Institute of Science and Technology. This paper appears on: American Control Conference*, 1999. Proceedings of the 1999 Publication Date http://ieeexplore.ieee.org/search/srchabstract.jsp?arnu.ber=782444&isnumber=16968&punumber=6343&k2doc. (Jun. 2005),3635-3639.

Dong, et al., "A New Direct Seek Control Design of Optical Disk Drives", *Microsystem Technologies Archive*. vol. 11, Issue 8 http://portal.acm.org.citation.cfm?id=1094380.1084406, (Aug. 2005),1071-1080.

\* cited by examiner

APPARATUS AND METHOD FOR ADJUSTING A FEED-FORWARD SIGNAL FOR SEEK CONTROL DURING A SEEK OPERATION

TECHNICAL FIELD

This embodied subject matter relates generally to the field of servo control systems and specifically adjusting a feed-forward signal for seek control during a seek operation.

BACKGROUND

A servo system is a control system that controls the operation of an apparatus through a series of feedback signals to the control system. The feedback signal is typically from a sensor that determines the offset of the actual operation of the apparatus from the requested operation of the apparatus. Some examples of servo systems are: a thermostat for controlling the temperature of a room; an autopilot for controlling the flying attitude and direction of an aircraft; a cruise control for controlling the speed of an automobile; a servo system in a hard disk drive (HDD) for controlling disk RPM and magnetic transducer position.

In a more sophisticated and precise apparatus such as an HDD, a servo system will also use a feed-forward signal. A feed-forward signal in an HDD provides control signals for actuating a voice coil motor, based upon a reference model stored in a control module. The reference model is based upon a nominal design of the HDD. In actual operation of the HDD the feed-forward signal from the reference model can be inaccurate in predicting control signals for actuating the voice coil motor due to tolerances in the numerous components that determine the performance of the voice coil motor. Inaccuracy in the feed-forward signal will cause a feedback signal from the magnetic transducer to compensate for the feed-forward inaccuracy and attempt to bring the magnetic transducer onto the desired data track.

The amount of data that can be stored on a disk is governed by many well-known physical principles. One factor in determining the amount of data that can be stored in an HDD is the ability of the magnetic transducer to write closely spaced data tracks onto the disk surface. The spacing of tracks on a disk surface is known as track pitch, and the unit of measure for expressing the density of tracks on a disk is tracks per inch or TPI. A smaller track pitch results in a higher TPI. The servo system of the HDD enables in part the magnetic transducer to be precisely positioned at a radius on the disk to write a data track, enabling adjacent data tracks to be written with a high TPI.

Once the data track is written, the HDD must be able to find the track and settle upon it in a minimal amount of time. This amount of time is typically known as seek-settle time, and when coupled with the time for the data to rotate to where it can be read and the time required for the HDD to decipher the data on the track, this total time is known as latency. An HDD user usually prefers short latency. The robustness of the servo system and accuracy of the feed-forward signal will determine if the magnetic transducer has settled on a desired data track or needs to make another attempt at settling on the data track.

An HDD is one example of a mechanism using a servo system. One of ordinary skill in the art will appreciate that embodiments presented are beneficial to a variety of mechanisms operable to a control or servo system. The HDD will be used for the sake of brevity and clarity to demonstrate the need for a well-controlled servo system and a servo system's vulnerability to problems.

SUMMARY

Various embodiments presented are described herein. A hard disk drive control module has a feed-forward signal input port communicatively coupled with a reference model. The hard disk drive control module has a tracking error signal input port communicatively coupled with a magnetic transducer of the hard disk drive. The hard disk drive control module has an error calculator module configured for determining a difference between an estimated tracking error signal in response to a first feed-forward signal and an actual tracking error signal of the magnetic transducer in response to the first feed-forward signal. The hard disk drive control module has a feed-forward signal adjuster module configured for adjusting a gain and a phase for a second feed-forward signal based on the difference between the estimated tracking error signal in response to the first feed-forward signal and the actual tracking error signal of the magnetic transducer. The hard disk drive control module has a feed-forward signal adjustment output port communicatively coupled to the second feed-forward signal.

BRIEF DESCRIPTION OF THE DRAWINGS

The accompanying drawings, which are incorporated in and form a part of this specification, illustrate embodiments presented and, together with the description, serve to explain the principles of embodied subject matter.

The drawings referred to in this description should not be understood as being drawn to scale except if specifically noted.

DETAILED DESCRIPTION

Reference will now be made in detail to the alternative embodiment(s) presented. While the embodied subject matter will be described in conjunction with the alternative embodiment(s), it will be understood that they are not intended to limit these embodiments. On the contrary, the embodied subject matter is intended to cover alternatives, modifications and equivalents, which may be included within the spirit and scope of the embodied subject matter as defined by the appended claims.

Furthermore, in the following detailed description of embodiments of the presented, numerous specific details are set forth in order to provide a thorough understanding of the present embodied subject matter. However, it will be recognized by one of ordinary skill in the art that embodiments of the present embodied subject matter may be practiced without these specific details. In other instances, well known methods, procedures, and components have not been described in detail as not to unnecessarily obscure aspects of the present embodied subject matter.

The discussion will begin with a description and overview of a control system and a servo system. The discussion will then focus on embodiments of the present embodied subject matter by which a feed-forward signal for controlling a servo command is adjusted while a mechanism is performing the servo operation. For the sake of brevity and clarity, the discussion will focus on an HDD as an example of a mechanism operable to a servo system which benefits from the embodiments presented.

Overview

Figure 1:
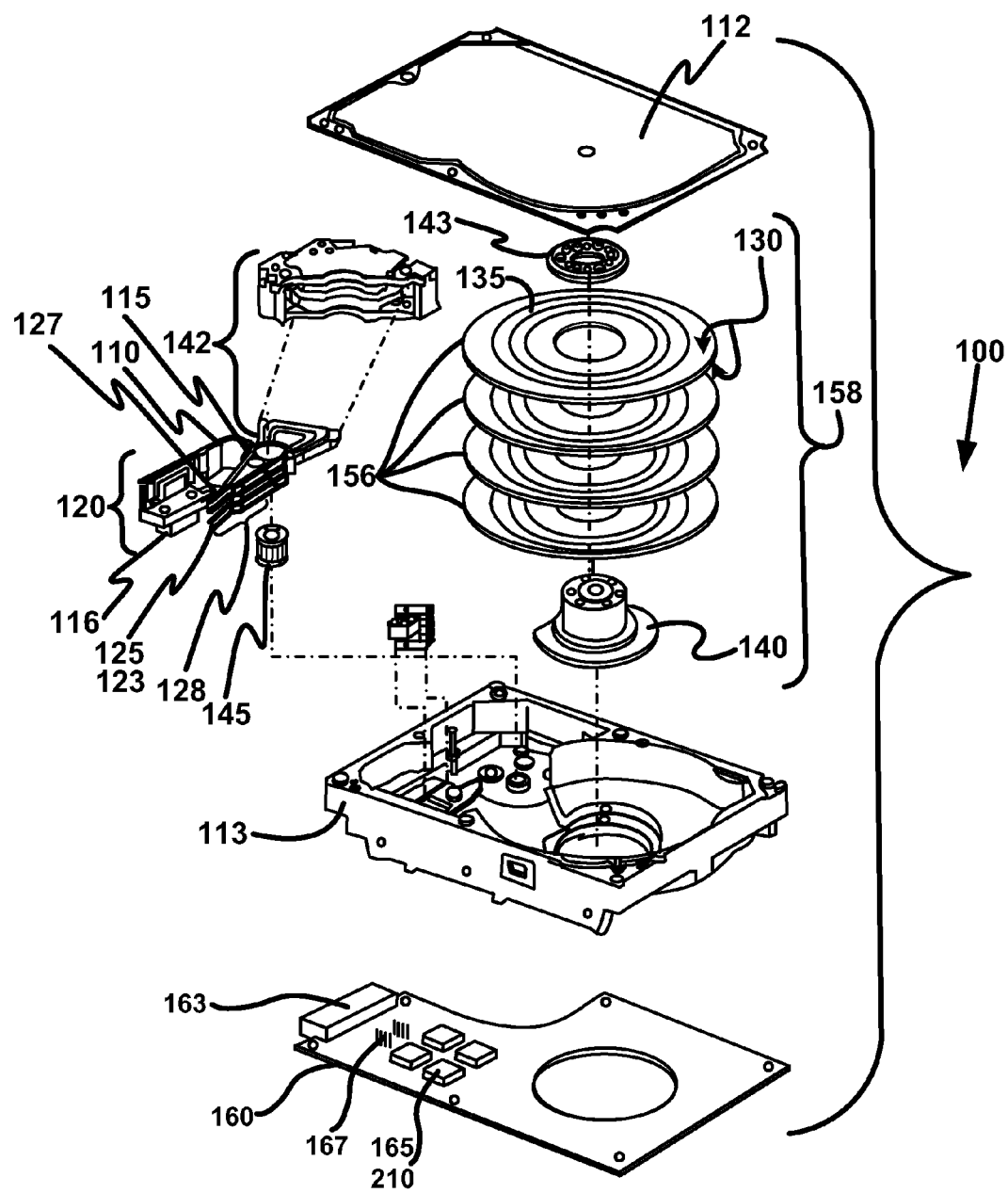
FIG. 1 is an isometric blow-apart of an HDD operable to embodiments presented.

With reference to FIG. 1, an isometric blow-apart of HDD 100 is presented in accordance with an embodiment presented. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, sometimes referred to as an actuator assembly or carriage, comprises suspension 127, which suspends hard disk drive slider 125 next to disk surface 130, and HSA connector 116. Hard disk drive slider 125 is comprised of magnetic transducer 123 which reads and writes data to and from data tracks 135. Suspension 127 and hard disk drive slider 125 comprise head gimbal assembly (HGA) 128. Flex cable 110, which is part of HSA 120, conveys data between HSA connector 116 and arm electronics (A/E) module 115. HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160.

PCB 160 comprises at least one electrical component 165 which is a control module 210 for VCM 142. Control module 210 comprises electrical components which enable control module 210 to present a feed-forward and feedback signal to VCM 142 so that VCM 142 is enabled to move slider 125 arcuately across disk surface 130 to access data tracks 135.

The feedback signal controls the position of magnetic transducer 123 to follow data tracks 135 during read or writing. The feed-forward signal moves magnetic transducer 123 from one data track 135 to another to achieve faster seek operation. The feed-forward signal is based on a reference model which typically assumes nominal design parameters for HDD 100. There is some flexibility built into control module 210 whereby the gain of the feed-forward signal can be offset for temperature effects imposed on electrical component 165.

Well known to one of ordinary skill in the art is a temperature sensor coupled with HDD 100 whereby, based on known correlations of temperature verses electrical component 165 performance, the feed-forward signal is offset for temperature effects on electrical devices within electrical component 165. Temperature can affect the gain of the feed-forward signal, whether it is ambient temperature in which HDD 100 is subjected to, or internal temperature generated by HDD 100.

Increases in track density and TPI are quickly approaching the limit of today's servo systems for maintaining reasonable access performance. The bandwidth for today's servo systems is not increasing commensurate with increasing TPI. Temperature sensing is no longer as effective as it was for offsetting the feed-forward signal for temperature effects on electrical devices. It has been discovered that with higher TPI demands, temperature is no longer the primary contributor to variations in seek-settle time experienced by VCM 142 and control module 210.

Variations in the hardware comprising HSA 120, and variations in the electrical devices comprising control module 210, have now become the main causes of variations in settle time for HSA 120. Due to manufacturing tolerances, the mass and vibration characteristics of HSA 120 can vary from HSA to HSA. Due to similar tolerances for the electrical components comprising control module 210, the drive characteristics can vary from control module to control module. Tolerances in electrical components comprising control module 210 present a challenge for providing accurate feed-forward signals for minimizing overshoot and undershoot of HSA 120 while accessing data tracks 135.

Physical Description

Figure 2:
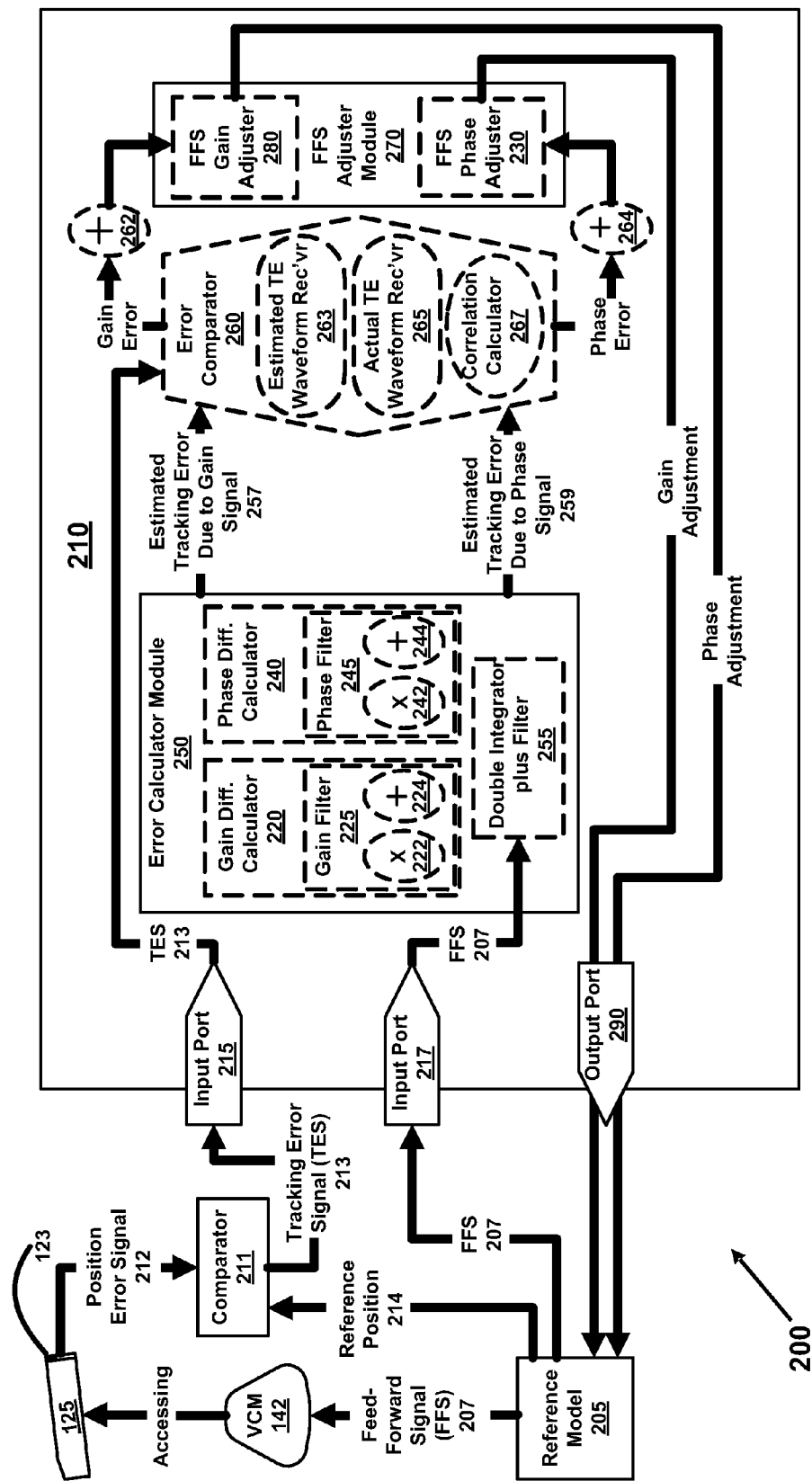
FIG. 2 is a schematic of a hard disk drive control module in accordance with one embodiment presented.

With reference to FIG. 2, schematic 200 of control module 210 is presented in accordance with one embodiment. Control module 210 has a feed-forward signal (FFS) input port 217 configured for receiving FFS 207 from reference model 205. Reference model 205 is an idealized model of HSA 120 which comprises a double integrator well known and understood by one of ordinary skill in the art. The output of reference model 205 comprises FFS 207 and reference position signal 214. FFS 207 enables VCM 142 to move HDD slider 125 and magnetic transducer 123 to a target position coinciding to a data track 135. Reference position signal 214 defines a target position to which magnetic transducer 123 is to be moved. While magnetic transducer 123 is moving from data track 135 to another, the value of reference position signal 214 is varying with time. While magnetic transducer 123 is track following for reading and writing data to and from data track 135, the value of reference position signal 214 is constant and fixed. The driving signal of VCM 142 is also modulated by a feedback signal which is based on the difference between reference position signal 214 and position error signal 212. Driving VCM 142 with a feedback signal is well known and understood by one of ordinary skill in the art.

Control module 210 has an input port 215 configured for receiving tracking error signal (TES) 213 from comparator

211. Comparator 211 compares position error signal (PES) 212 and reference position signal 214. PES 212 is received from magnetic transducer 123, which is coupled with HDD slider 125. PES 212 communicates the actual position of HDD slider 125 and magnetic transducer 123 with respect to data track 135. PES 212, TES 213, and their use for driving VCM 142 according to the actual position of HDD slider 125 and magnetic transducer 123 with respect to data track 135 are well known and understood by one of ordinary skill in the art.

With continued reference to FIG. 2, and in accordance with an embodiment presented, control module 210 comprises error calculator module 250. Error calculator module 250 is configured for determining a difference between an estimated tracking error signal in response to a first FFS 207 and TES 213 at an actual arrival time of magnetic transducer 123 on data track 135 in response to the first FFS 207. The actual arrival time of magnetic transducer 123 on data track 135 is determined by the magnitude of PES 212.

For purposes of describing the embodied subject matter, the term "signal" refers to the data content transferred between entities, e.g. a magnetic transducer and an A/E module. The term "waveform" refers to the shape of a signal, such as those shapes (waveforms) presented in FIGS. 4, 5, 6, and 7.

In accordance with an embodiment presented, error calculator module 250 comprises FFS double integrator plus filter 255 configured for double integrating and filtering FFS 207 and adding effects of feedback compensation during the seeking and settling of magnetic transducer 123. The filtering of FFS 207 by double integrator plus filter 255 results in an estimated position of magnetic transducer 123 which is coupled to HDD slider 125. In accordance with an embodiment presented, error calculator module 250 comprises gain difference calculator 220 and phase difference calculator 240. Gain difference calculator 220 and phase difference calculator 240 are configured for calculating a gain error and a phase error from an estimated position of magnetic transducer 123 and TES 213 when magnetic transducer 123 reach the target location of data track 135 on disk surface 130 based on the first FFS 207.

In accordance with an embodiment presented, gain difference calculator 220 comprises gain filter 225. Gain filter 225 comprises at least one multiplication node 222. In accordance with another embodiment presented, gain filter 225 comprises at least one summation node 224. Gain filter 225 is configured for estimating a tracking error waveform when a gain of the reference model 205 differs from an actual value based on a first FFS 207. Although an actual gain value is not known, TES 213 becomes minimal when reference model 205 matches an actual gain value. When the gain of reference model 205 is off by certain amount, TES 213 becomes non zero. The resulting TES 213 is equal to the one which is calculated from the waveform of FFS 207 multiplied by the gain difference, characteristics of nominal reference model 205, and the effect of feedback compensation. The input of gain filter 225 is FFS 207 and the characteristic of gain filter 225 comprises reference model 205 and the characteristics of the feedback compensation. The output of gain filter 225 is the estimated tracking error signal 257 due to the gain error of reference model 205 and its magnitude becomes larger when the gain of reference model 205 is off from an actual gain value.

In accordance with an embodiment presented, phase difference calculator 240 comprises phase filter 245. Phase filter 245 comprises at least one multiplication node 242. In accordance with another embodiment presented, phase filter 245 comprises at least one summation node 244. Phase filter 245 is configured for estimating a tracking error waveform when phase or time delay of the reference model 205 differs from an actual value based on a first FFS 207. Although an actual phase value is not known, TES 213 becomes minimal when reference model 205 matches an actual phase value. When the phase of reference model 205 is off by certain amount, TES 213 becomes non zero. The resulting TES 213 is equal to the one which is calculated from the waveform of FFS 207 multiplied by the phase difference, characteristics of nominal reference model 205, and the effect of feedback compensation. The input of phase filter 245 is FFS 207 and the characteristic of phase filter 245 comprises reference model 205 and the characteristics of the feedback compensation. The output of phase filter 245 is the estimated tracking error signal 259 due to the phase error of reference model 205 and its magnitude becomes larger when the phase of reference model 205 is off from an actual phase value.

Gain filter 225 and phase filter 245 can be similar in their configuration. Multiplication node 222 and multiplication node 242 can be similar in their configuration. Summation node 224 and summation node 244 can be similar in their configuration.

In accordance with an embodiment presented, control module 210 comprises error comparator 260. Error comparator 260 is configured for receiving and comparing estimated tracking error signal 257 due to a gain error and estimated tracking error signal 259 due to a phase and/or gain error received from FFS double integrator plus filter 255 and/or error calculator module 250.

In accordance with an embodiment presented, error comparator 260 is configured for calculating the gain and the phase difference from actual values by calculating the correlation between estimated tracking error signal 257 and TES 213 and the correlation between estimated tracking error signal 259 and TES 213. Error comparator 260 comprises estimated tracking error waveform receiver 263 and actual tracking error waveform receiver 265. Estimated tracking error waveform receiver 263 is configured to receive estimated tracking error signal (257, 259) from error calculator module 250. Actual tracking error waveform receiver 265 is configured to receive TES 213 from magnetic transducer 123 on data track 135 via input port 215.

In accordance with an embodiment presented, control module 210 has FFS adjuster module 270 which is configured for adjusting a gain and a phase for a second FFS 207. FFS adjuster module 270 is configured to adjust a second FFS 207 based on the output from correlation calculator 267 in response to the first FFS 207. The output from correlation calculator 267 comprises the difference between estimated tracking error signal (257, 259) in response to said first FFS 207 and said actual tracking error signal of magnetic transducer 123.

In accordance with another embodiment presented, control module 210 comprises gain summation node 262, and phase summation node 264. Gain summation node 262 is configured to receive a gain correlation value from error comparator 260 and to transmit and add the gain correlation value to FFS gain adjuster 280 within FFS adjuster module 270 based on a comparison performed by error comparator 260. Phase summation node 264 is configured to receive a phase correlation value from error comparator 260 and to transmit and add the phase correlation value to FFS phase adjuster 230 within FFS adjuster module 270 based on a comparison performed by error comparator 260.

In accordance with an embodiment presented, control module 210 has FFS adjustment output port 290 which is configured for communicatively coupling to reference model 205 and a second FFS 207. FFS adjustment output port 290 is configured to receive a gain adjustment and/or the phase adjustment from FFS adjuster module 270 and transmit the gain adjustment and/or phase adjustment to reference model 205 and a second FFS 207.

In accordance with another embodiment presented, control module 210 comprises correlation calculator 267, which is configured for calculating a correlation between an actual tracking error signal and an estimated tracking error waveform.

Operation

Figure 3:
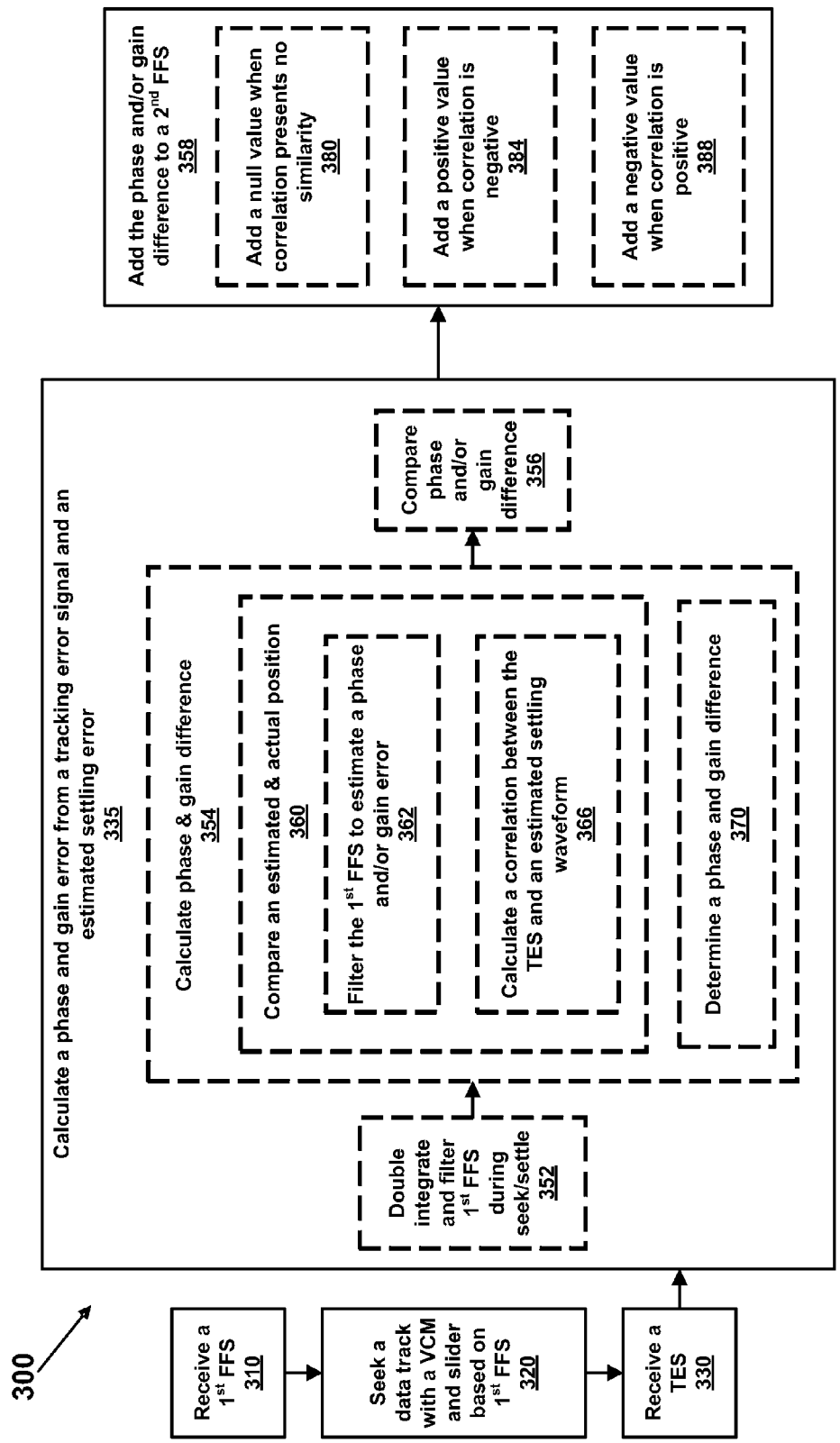
FIG. 3 is a flow chart illustrating a process for adjusting a feed-forward signal for seek control during a seek operation in accordance with one embodiment presented.

FIG. 3 is a flow chart illustrating a process 300 for adjusting a feed-forward signal for seek control during a seek operation in accordance with an embodiment presented. One of ordinary skill in the art will appreciate that embodiments of the present embodied subject matter are beneficial to a variety of mechanisms operable to a servo system. An HDD will be used for the sake of brevity and clarity to demonstrate embodiments of the present embodied subject matter. Process 300 is a dynamic process and is performed while a servo system, such as a servo system in a hard disk drive, is in operation.

A feed-forward signal and a reference position signal are generated by a reference model which is an idealized model of the servo system that assumes nominal operating conditions, nominal component performance, and nominal component tolerances. A position error signal from a component under a servo system's control, for example an HDD slider and magnetic transducer, communicates to the servo system, the actual position of the HDD slider and magnetic transducer, which based on the feed-forward signal have moved to a predefined data track. In accordance with embodiments of the present embodiment, the feed-forward signal is adjusted for a subsequent feed-forward signal enabling a voice coil motor to position a slider upon a data track.

In accordance with embodiments presented, adjusting a feed-forward signal for a subsequent move of the HDD slider and magnetic transducer comprises adjusting a phase and/or a gain of the feed-forward signal. Whether the phase and/or gain are adjusted depends upon the correlation of a tracking error signal with the estimated tracking error waveform due to phase and/or gain error. An estimated tracking error waveform is derived from a double integration and filtering of a preceding feed-forward signal.

In one embodiment, processors and electrical components under the control of computer readable and computer executable instructions carry out process 300. The computer readable and computer executable instructions reside, for example, in data storage features such as computer usable volatile and non-volatile memory. However, the computer readable and computer executable instructions may reside in any type of computer readable medium. Although specific components are disclosed in process 300, such components are examples of components for carrying out process 300. That is, the embodiments of the present embodied subject matter are well suited to performing various other components or variations of the components recited in FIG. 3. Within the present embodiment, it is appreciated that the components of process 300 may be performed by software, by hardware, by an assembly mechanism, through human interaction, or by any combination of software, hardware, assembly mechanism, and human interaction.

Process 300 will be described with reference to elements shown in FIG. 1 and FIG. 2.

In one embodiment, as shown at element 310 of process 300, a first feed-forward signal (FFS) 207 is received from reference model 205. FFS 207 is associated with a location of data track 135 on disk surface 130. FFS 207 comprises a current that is communicatively coupled to VCM 142 whereby VCM 142 is energized to arcuately move HDD slider 125 and an associated magnetic transducer 123, across disk surface 130, thus seeking data track 135.

In one embodiment, as shown at element 320 of process 300, data track 135 is sought with VCM 142 and slider 125 based on a first FFS 207. VCM 142 receives a current in first FFS 207 which coincides with an acceleration that is estimated by reference model 205 to move HSA 120 such that HDD slider 125 and magnetic transducer 123 seek a desired data track 135.

In one embodiment, as shown at element 330 of process 300, TES 213 is received from comparator 211 which compares an actual position derived from PES 212 and reference position signal 214 from reference model 205. PES 212 is received from magnetic transducer 123 which is coupled to HDD slider 125. PES 212 is associated with an actual location of data track 135 on disk surface 130. PES 212 is generated in response to VCM 142 seeking a data track 135 based on FFS 207. It is well known and understood by one of ordinary skill in the art that a feedback signal, such as PES 212, can be analyzed to obtain an actual track position, an actual seek-settle time, an actual acceleration and gain of motion for HDD slider 125.

In one embodiment, as shown at element 335 of process 300, a phase and gain difference is calculated for an actual arrival time derived from TES 213, and an estimated tracking error signal (257, 259) received from error calculator module 250. In another embodiment, as shown at element 352 of process 300, first FFS 207 is double integrated and filtered during seeking and settling of magnetic transducer 123. It is well understood by one of ordinary skill in the art that the first integral of acceleration, such as the acceleration component of first FFS 207, results in velocity. The integration of velocity (the second or double integration of acceleration) results in a position. In accordance with an embodiment presented, first FFS 207 is integrated twice to derive the position to which magnetic transducer 123 is estimated to move, and filtered to simulate the effects of a conventional feedback loop.

In one embodiment, element 335 of process 300 comprises element 354, wherein a phase difference and a gain difference of reference model 205 are calculated from the double integrated and filtered first FFS 207. Phase and gain differences of reference model 205 are calculated after seeking and settling of magnetic transducer 123 are completed in response to first FFS 207. A phase difference of reference model 205 is calculated from the estimated settling error waveform due to phase error and the actual arrival waveform of magnetic transducer 123 on data track 135. The estimated settling error waveform due to phase error is derived from the double integration and filtering of first FFS 207. The actual waveform of arrival for magnetic transducer 123 on data track 135 is derived from the difference between reference position signal 214 and PES 212. A gain difference for the motion of magnetic transducer 123 is calculated from an estimated settling error waveform due to gain error and the actual waveform of arrival for magnetic transducer 123 derived from the difference between a reference position signal 214 and PES 212

In one embodiment, element 354 of process 300 comprises element 360, wherein an estimated position of magnetic transducer 123 which is derived from the double integration and filtering of first FFS 207, is compared to an actual position of magnetic transducer 123 which is derived from PES 212.

In accordance with an embodiment presented, element 360 comprises element 362, wherein the first FFS 207 received from reference model 205 is double integrated during seeking and settling of magnetic transducer 123. In so doing a position error signal is simulated if there is a phase and/or gain error in the first FFS 207.

In accordance with an embodiment presented, element 360 comprises element 366 wherein a correlation is calculated between an actual tracking error waveform of a tracking error signal (TES) and an estimated tracking error waveform, which is due to phase and/or gain difference.

In one embodiment, element 354 of process 300 comprises element 370, wherein the phase difference and/or the gain difference is determined from comparisons performed within element 360.

Figure 4:
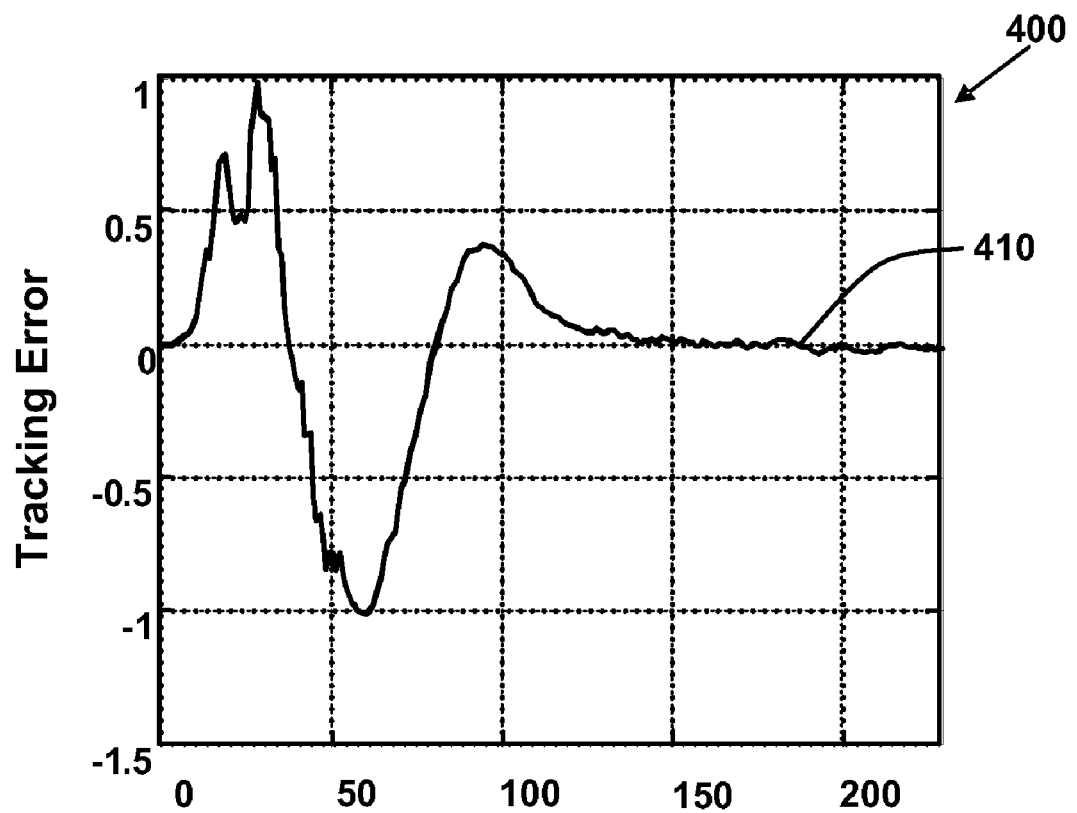
FIG. 4 is a plot of an actual tracking error waveform of a position error signal in accordance with one embodiment presented.
Figure 5:
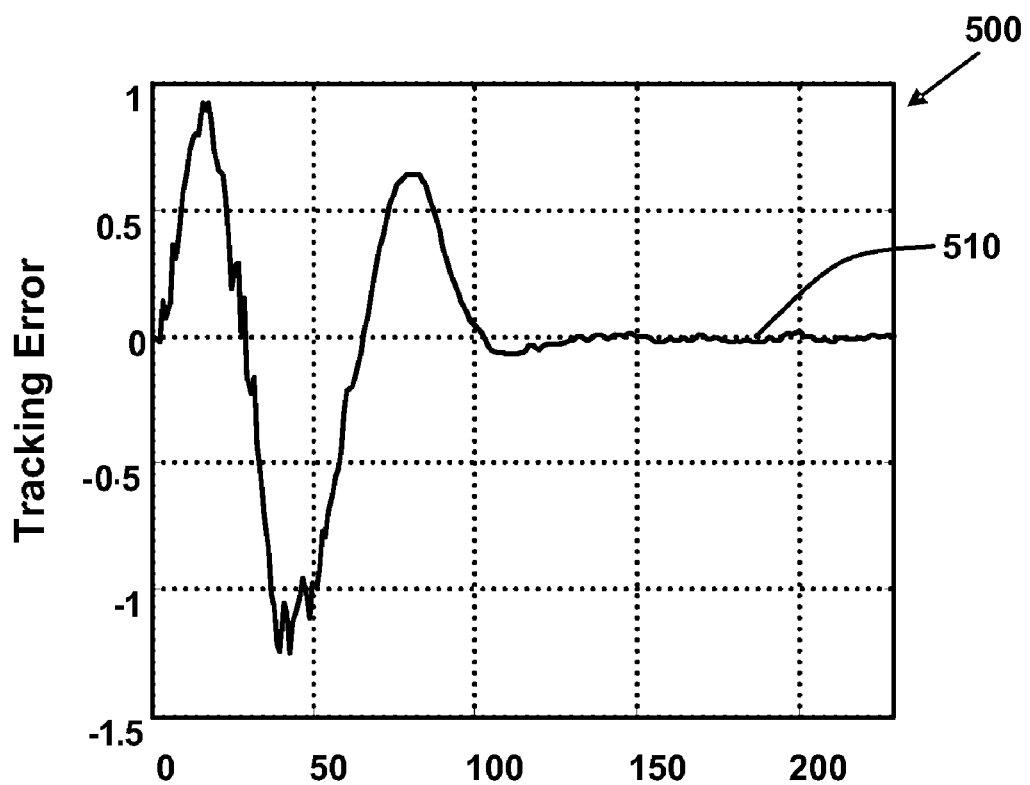
FIG. 5 is a plot of an actual tracking error waveform of a position error signal in accordance with one embodiment presented.

With reference to FIG. 4, and in accordance with an embodiment presented, plot 400 presents an actual tracking error waveform 410 of a position error signal, wherein the gain of reference model 205 differs from an actual gain value. With reference to FIG. 5, and in accordance with an embodiment presented, plot 500 presents an actual tracking error waveform 510 of a position error signal, wherein the phase of reference model 205 differs from an actual phase value. On inspection of actual tracking error waveform 410 and actual tracking error waveform 510 differences can be seen in the magnitude and timing of their peaks and valleys.

Figure 6:
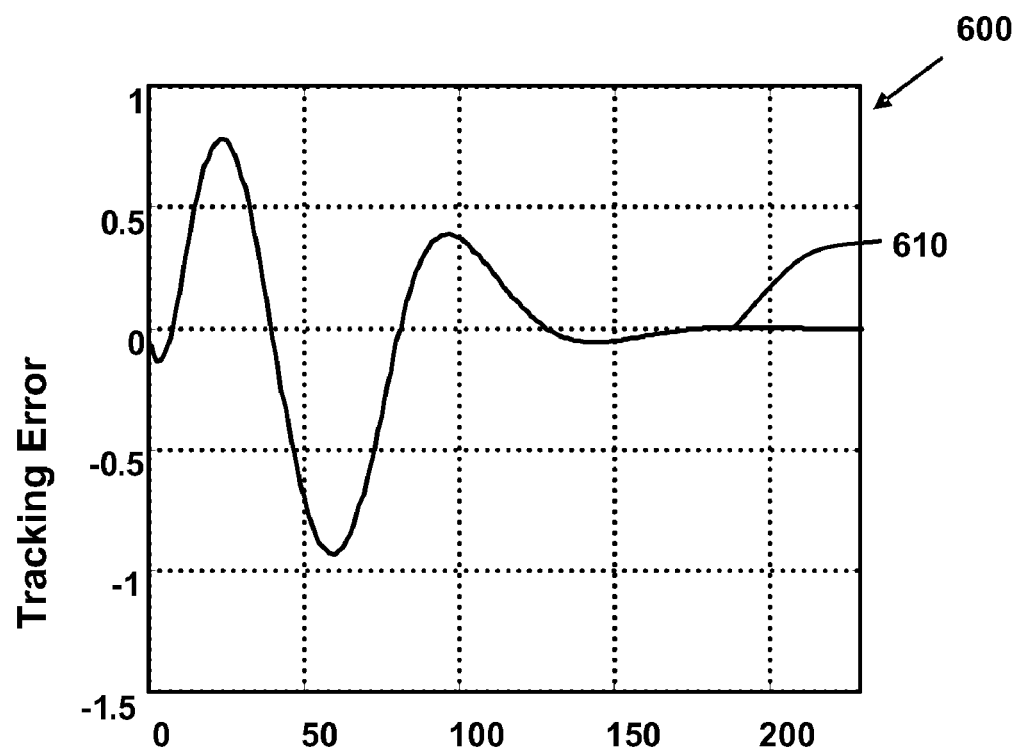
FIG. 6 is a plot of an estimated tracking error waveform from a reference model in accordance with one embodiment presented.

With reference to FIG. 6, and in accordance with an embodiment presented, plot 600 presents estimated gain tracking error waveform 610, which is derived from FFS 207. Estimated gain tracking error waveform 610 is the filtered acceleration component from FFS 207 plotted against a time in which magnetic transducer 123 will settle on data track 135. Estimated gain tracking error waveform 610 presents an estimated tracking error during seeking, wherein the gain of reference model 205 differs from an actual gain value.

Figure 7:
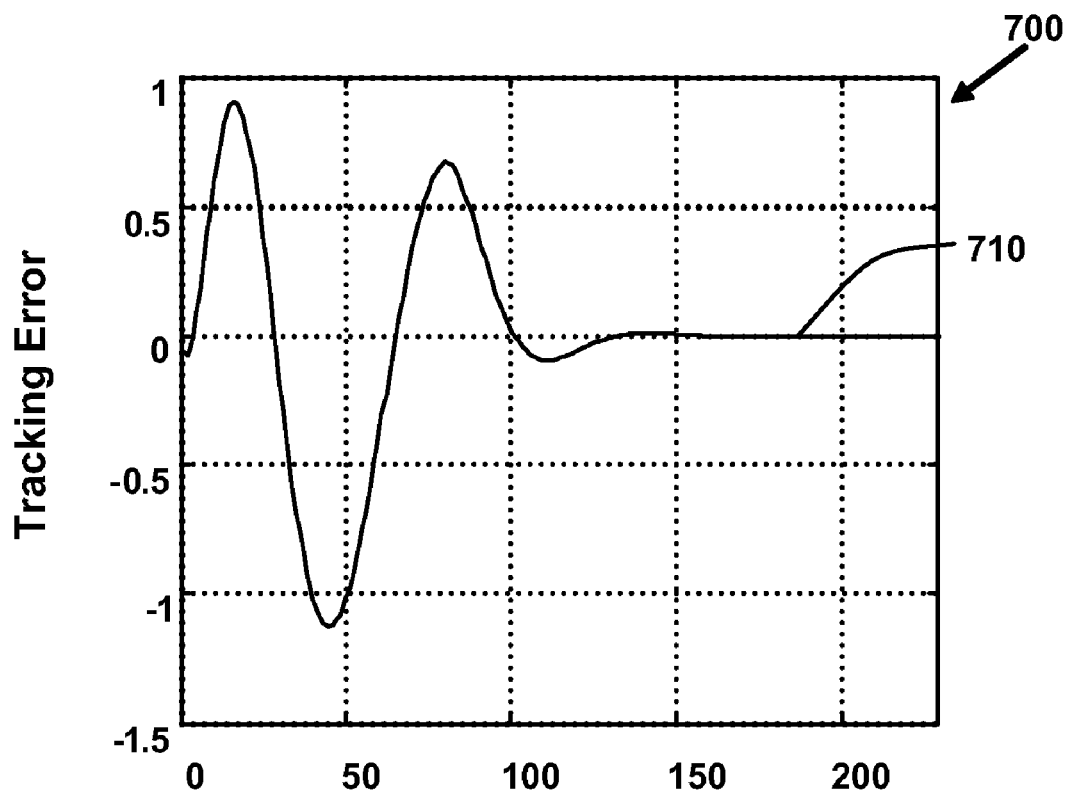
FIG. 7 is a plot of an estimated tracking error waveform from a reference model in accordance with one embodiment presented.

With reference to FIG. 7, and in accordance with an embodiment presented, plot 700 presents estimated phase tracking error waveform 710, which is derived from FFS 207. Estimated phase tracking error waveform 710 is the filtered and double integrated acceleration component from FFS 207 plotted against a time estimated by reference model 205 in which magnetic transducer 123 will settle on data track 135. Estimated phase tracking error waveform 710 presents an estimated tracking error during seeking, wherein the phase of reference model 205 differs from an actual value.

On inspection of estimated gain tracking error waveform 610 and estimated phase tracking error waveform 710 differences can be seen in the magnitude and timing of their peaks and valleys.

In one embodiment, as shown at element 366 of process 300 a correlation is calculated for an actual tracking error waveform with respect to an estimated tracking error waveform. A correlation that is calculated will indicate how well the actual tracking error waveform resembles an estimated gain tracking error waveform, such as that of estimated gain tracking error waveform 610, or resembles an estimated phase tracking error waveform, such as that of estimated phase tracking error waveform 710.

In one embodiment, as shown at element 370 of process 300 the phase difference and the gain difference are determined from the result of correlation element 366. At least one estimated tracking error waveform of gain and phase is determined from correlation element 366. At least one actual tracking error waveform, which is in response to FFS 207, is compared with at least one estimated tracking error waveform due to gain and phase error. For example, actual tracking error waveform (410, 510) is compared with estimated gain tracking error waveform 610 and with estimated phase tracking error waveform 710. On inspection an approximate match of actual tracking error waveform 410 can be made with estimated gain tracking error waveform 610. On inspection an approximate match of actual tracking error waveform 510 can be made with estimated phase tracking error waveform 710. The correlation calculated at element 366 will quantify the match between waveforms.

In one embodiment, as shown at element 356 of process 300 actual tracking error waveform (410, 510) may not be a reasonable approximate match with estimated gain tracking error waveform 610 or estimated phase tracking error waveform 710. It is possible that an approximate match exists with a combination of both estimated gain tracking error waveform 610 and estimated phase tracking error waveform 710. The correlation calculated at element 366 will quantify the amount of match between actual tracking error waveform (410, 510) with estimated gain tracking error waveform 610 and/or with estimated phase tracking error waveform 710.

In another embodiment, as shown at element 356 of process 300 the phase and/or gain difference that are calculated at element 354 are compared to at least one estimated tracking error waveform that is predefined and resides in an electrical component 165 of HDD 100.

In one embodiment, as shown at element 358 of process 300, the phase difference and/or gain difference, which were calculated at element 354, is added to a second FFS 207.

In another embodiment, element 358 of process 300 comprises element 380, wherein a null value is added to a second FFS 207 when the correlation calculated at element 370 presents no similarity between an actual tracking error waveform and an estimated tracking error waveform. A null value added to a second FFS 207 does not change the actual tracking error waveform that results from a second FFS 207 from the first FFS 207. For example, a correlation calculated at element 370 presents no similarity between an actual tracking error waveform and an estimated phase tracking error waveform, resulting in a null value added to a phase of a second FFS 207. In another example, a correlation calculated at element 370 presents no similarity between an actual tracking error waveform and an estimated gain tracking error waveform, resulting in a null value added to a gain of a second FFS 207.

In another embodiment, element 358 of process 300 comprises element 384, wherein a positive value is added to a second FFS 207 when the correlation calculated at element 370 presents a positive correlation between an actual tracking error waveform and an estimated tracking error waveform. A negative value added to a second FFS 207 changes the actual tracking error waveform resulting from the second FFS 207 such that the actual tracking error waveform resulting from the second FFS 207 becomes minimal in magnitude. For example, a correlation calculated at element 370 presents a positive correlation between an actual tracking error waveform and an estimated phase tracking error waveform. Therefore a negative value is added to a phase of a second FFS 207 and causes the actual tracking error waveform from the second FFS 207 to be minimal in magnitude. In another example, a correlation calculated at element 370 presents a positive correlation between an actual tracking error waveform and an estimated gain tracking error waveform. Therefore a negative value is added to a gain of a second FFS 207 and causes the actual tracking error waveform of a TES from the second FFS 207 to be minimal in magnitude.

In another embodiment, element 358 of process 300 comprises element 388, wherein a positive value is added to a second FFS 207 when the correlation calculated at element 370 presents a negative correlation between an actual tracking error waveform and an estimated tracking error waveform. A positive value added to a second FFS 207 changes the actual tracking error waveform resulting from the second FFS 207 such that the actual tracking error waveform resulting from the second FFS 207 is minimal in magnitude. For example, a correlation calculated at element 370 presents a negative correlation between an actual tracking error waveform and an estimated phase tracking error waveform. Therefore a positive value is added to a phase of a second FFS 207 and causes the actual phase tracking error waveform from the second FFS 207 to be minimal in magnitude. In another example, a correlation calculated at element 370 presents a negative correlation between an actual tracking error waveform and an estimated gain tracking error waveform. Therefore a positive value is added to a gain of a second FFS 207 and causes the actual gain tracking error waveform from the second FFS 207 to be minimal in magnitude.

The present subject matter, in the various presented embodiments, provides a method and apparatus for adjusting during a seek operation, a feed-forward signal. The various embodiments of the present subject matter enable a feed-forward signal to be adjusted accurately by using a preceding feed-forward signal and its correlation to an estimate of the resulting tracking error waveform. By basing an adjustment of the feed-forward signal on the performance of the servo system, i.e. voice coil motor, suspension, slider, control module, and electrical components, the tolerances of the servo system are negated and nullified.

Embodiments of the present subject matter enable a higher level of accuracy of voice coil motor operation than what has been possible. By adjusting the phase of a tracking error waveform as well as the gain in a manner based on actual servo system performance, the overshoot and undershoot of the magnetic transducer on a data track is greatly reduced.

A result of improvements enabled by embodiments of the present subject matter is an HDD with shorter latency and faster seek-settle time. A user of an HDD, which uses embodiments of the present subject matter, will be able to manipulate more data faster.

The foregoing descriptions of specific embodiments of the present subject matter have been presented for purposes of illustration and description. They are not intended to be exhaustive or to limit the presented subject matter to the precise forms disclosed, and many modifications and variations are possible in light of the above teaching. The embodiments described herein were chosen and described in order to best explain the principles of the presented subject matter and its practical application, to thereby enable others skilled in the art to best utilize the presented subject matter and various embodiments with various modifications as are suited to the particular use contemplated. It is intended that the scope of the presented subject matter be defined by the Claims appended hereto and their equivalents.

What is claimed is:

1. A hard disk drive control module comprising:
a feed-forward signal input port communicatively coupled with a reference model;
a tracking error signal input port communicatively coupled with a magnetic transducer of said hard disk drive;
an error calculator module configured for determining a difference between an estimated tracking error signal in response to a first feed-forward signal and an actual tracking error signal of said magnetic transducer in response to said first feed-forward signal, said error calculator comprising:
a feed-forward signal double integrator configured for double integrating and filtering said first feed-forward signal during seeking and settling of a magnetic transducer, resulting in an estimated position of said magnetic transducer;
a gain difference calculator configured for calculating a gain error from said double integrated and filtered first feed-forward signal, after seeking and settling of said magnetic transducer are completed based on said first feed-forward signal; and
a phase difference calculator configured for calculating a phase error from said double integrated and filtered first feed-forward signal, after seeking and settling of said magnetic transducer are completed based on said first feed-forward signal;
a feed-forward signal adjuster module configured for adjusting a gain and a phase for a second feed-forward signal based on said difference between said estimated tracking error signal in response to said first feed-forward signal and said actual tracking error signal of said magnetic transducer;
a feed-forward signal adjustment output port communicatively coupled to said second feed-forward signal;
an error comparator configured for comparing said gain error and said phase error from said double integrated and filtered first feed-forward signal, to an estimated tracking error waveform due to gain error and an estimated tracking error waveform due to phase error;
a gain summation node configured for adding said gain error to a gain of said second feed-forward signal, based on a comparison performed by said error comparator; and
a phase summation node configured for adding said phase error to a phase of said second feed-forward signal, based on a comparison performed by said error comparator.

2. The hard disk drive control module of claim 1 wherein said gain difference calculator configured for calculating a gain error comprises:
a filter configured for estimating a tracking error waveform due to said gain error from said double integrated and filtered first feed-forward signal based on said first feed-forward signal.

3. The hard disk drive control module of claim 1 wherein said phase difference calculator configured for calculating a phase error comprises:
a filter configured estimating a tracking error waveform due to said phase error from said double integrated and filtered first feed-forward signal based on said first feed-forward signal.

4. The hard disk drive control module of claim 1 wherein said error comparator comprises:
an estimated tracking error waveform receiver; and
an actual tracking error waveform receiver.

5. The hard disk drive control module of claim 1 wherein said error comparator further comprises:
a correlation calculator configured for calculating a correlation between an actual tracking error signal and an estimated tracking error waveform.

6. A method for adjusting a feed-forward signal during a seek operation, said feed-forward signal enabling a voice coil motor to position a magnetic transducer upon a data track, said method comprising:
receiving a first feed-forward signal from a reference model associated with a location of said data track;
receiving a tracking error signal derived from a position error signal from a magnetic transducer coupled to said slider;

seeking said data track with said voice coil motor and said slider based on said first feed-forward signal;

calculating a phase difference of said reference model from an actual value which is indicated by said tracking error signal, and an estimated tracking error signal derived from said first feed-forward signal received from said reference model; and adding said phase difference to a second feed-forward signal;

double integrating and filtering said first feed-forward signal during seeking and settling of said voice coil motor and said slider;

filtering said first feed-forward signal;

calculating a phase difference and a gain difference from said double integrated and filtered first feed-forward signal after said seeking and said settling of said magnetic transducer are completed in response to said first feed-forward signal;

comparing said phase difference and said gain difference; and adding said phase difference and said gain difference to a respective gain and phase of said second feed-forward signal based upon said comparing.

7. The method as recited in claim 6, wherein said calculating a phase difference and a gain difference comprising:

comparing an estimated tracking error of said magnetic transducer to an actual tracking error of said magnetic transducer comprising;

double integrating and filtering said first feed-forward signal to determine an estimated tracking error from said reference model; and determining said phase difference and said gain difference between said actual tracking error signal waveform, which is based on said feed-forward signal, and said estimated tracking error signal waveform, which is based on said reference model.

8. The method as recited in claim 6, wherein said calculating a phase difference and a gain difference comprising:

calculating a correlation between an actual tracking error waveform and an estimated tracking error waveform.

9. The method as recited in claim 6, wherein said adding said phase difference and said gain difference to a second feed-forward signal comprising:

adding a null value to said second feed-forward signal when said correlation presents no similarity between said actual tracking error waveform and said estimated tracking error waveform.

10. The method as recited in claim 6, wherein said adding said phase difference and said gain difference to a second feed-forward signal comprising:

adding a negative value to said second feed-forward signal when said correlation between said actual tracking error waveform and said estimated tracking error waveform is positive.

11. The method as recited in claim 6, wherein said adding said phase difference and said gain difference to a second feed-forward signal comprising:

adding a positive value to said second feed-forward signal when said correlation between said estimated tracking error waveform and said actual tracking error waveform is negative.

* * * * *